Figure 3:
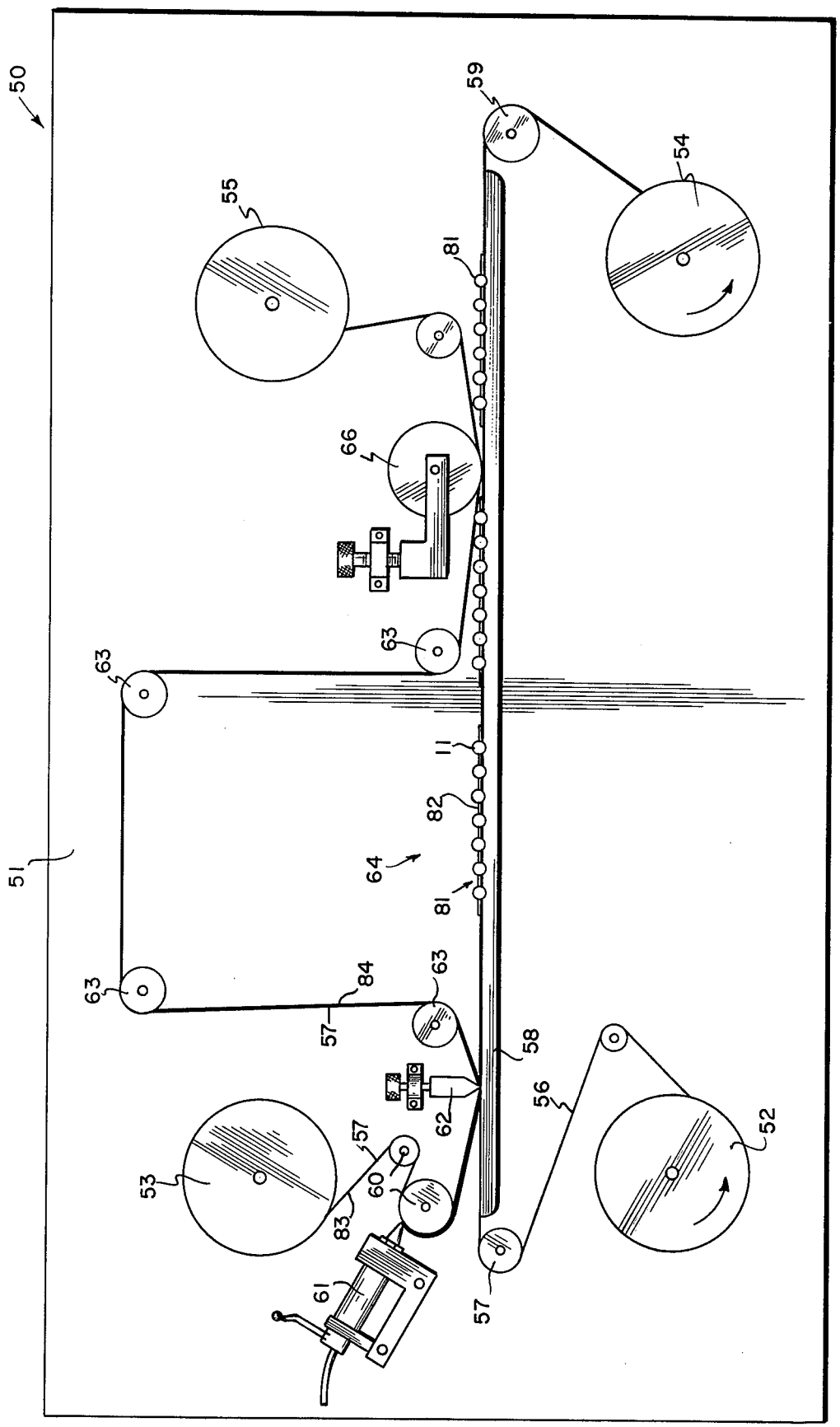

United States Patent [19]

Klein

[11] 4,104,985

[45] Aug. 8, 1978

[54] APPARATUS FOR APPLYING MATERIAL TO A SUBSTRATE

[75] Inventor: Gerhart P. Klein, Manchester, Mass.

[73] Assignee: P. R. Mallory & Co. Inc., Indianapolis, Ind.

[21] Appl. No.: 684,130

[22] Filed: May 7, 1976

Related U.S. Application Data

[62] Division of Ser. No. 527,682, Nov. 27, 1974, abandoned.

[51] Int. Cl.² .............................................. B05C 1/02
[52] U.S. Cl. .................................... 118/211; 118/226; 118/257
[58] Field of Search ................ 118/257, 211, 226, 223

[56] References Cited

U.S. PATENT DOCUMENTS

| 1,306,649 | 6/1919 | Weinheim | 118/257 X |
|---|---|---|---|
| 1,691,023 | 11/1928 | Dye | 118/257 X |
| 2,766,136 | 10/1956 | Gray | 118/DIG. 21 |
| 3,291,637 | 12/1966 | Ramos | 118/257 X |
| 3,394,441 | 7/1968 | Weiss | 427/79 X |
| 3,487,812 | 1/1970 | Salzwedel | 118/257 X |
| 3,589,926 | 6/1971 | Eckert et al. | 118/257 X |
| 3,695,223 | 10/1972 | Dunham et al. | 118/257 X |

Primary Examiner—John P. McIntosh
Attorney, Agent, or Firm—Hoffmann, Meyer & Coles

[57] ABSTRACT

A means and method are provided for applying material to a substrate. In the means and the method, material is disposed onto belt means and the belt means brought in contact with the substrate so as to transfer at least some of the material onto the substrate. The invention is particularly adaptable to the application of a band of silicone type material to a riser of an anode to be used in an electrolytic film-forming metal capacitor, the band of silicone type material helping to protect the anode riser during capacitor manufacture.

4 Claims, 4 Drawing Figures

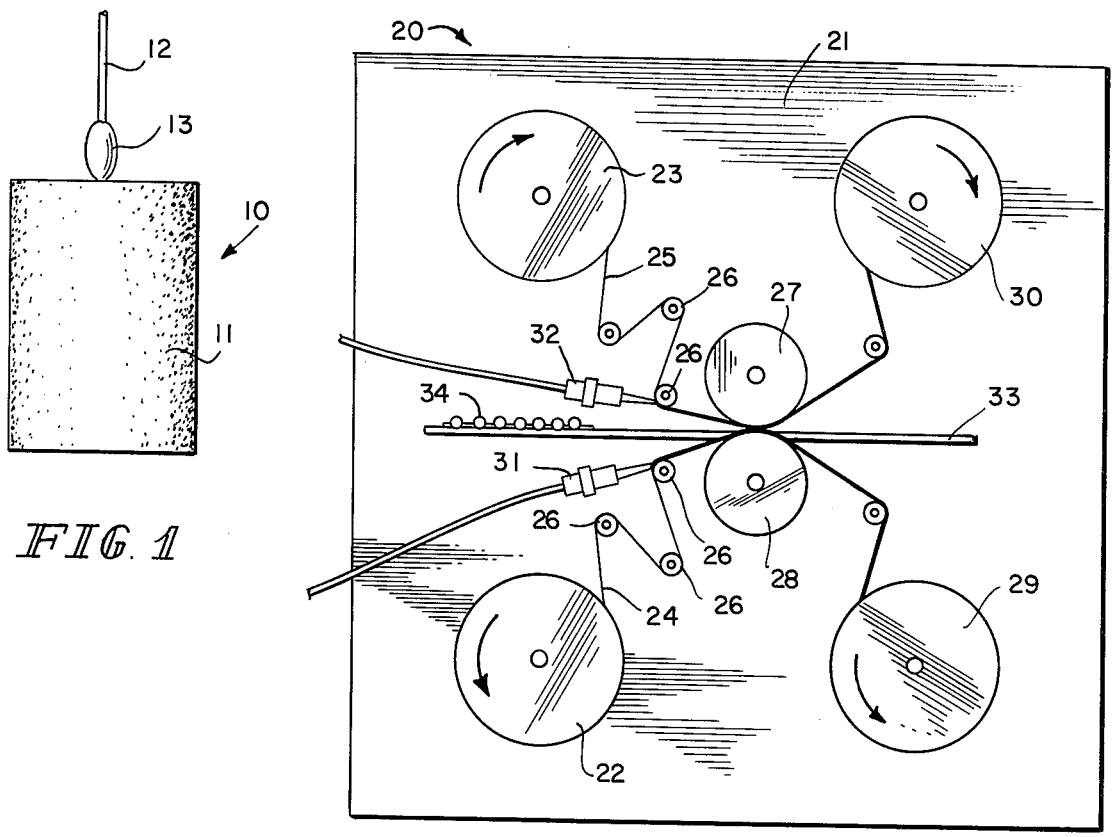
FIG. 1
FIG. 2
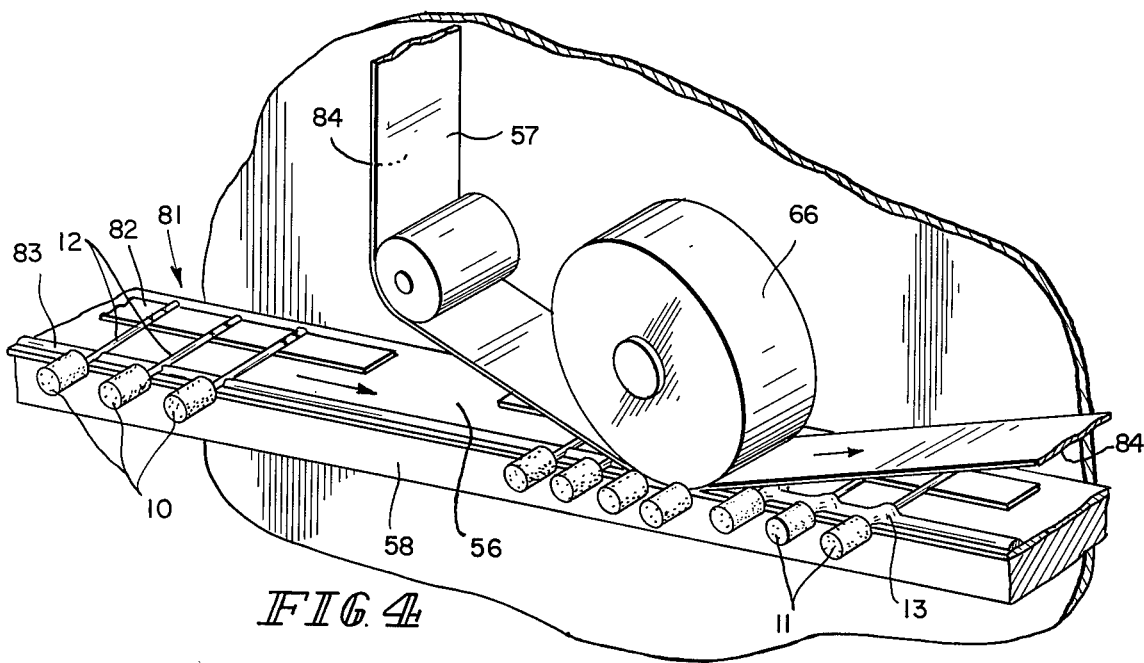
FIG. 4

APPARATUS FOR APPLYING MATERIAL TO A SUBSTRATE

This is a division of application Ser. No. 527,682, filed Nov. 27, 1974, now abandoned.

The present invention relates to a means for applying material to a substrate. The invention is particularly adaptable for use in the manufacture of solid electrolyte film-forming metal capacitors such as tantalum capacitors.

Although the present invention will be discussed throughout this disclosure with reference to its use in the manufacture of solid electrolyte film-forming metal capacitors, it should be realized and understood that the means and method of the invention are adaptable to a wide variety of other uses where material is required to be applied to a substrate. The present invention may find use in the manufacture of other electrical components such as resistors, inductors, transistors, controls, and the like. Other possible uses may include masking operations, decorative applications and the like which require a uniform and precisely applied band of material on a substrate.

Solid electrolyte film-forming metal capacitors generally comprise a porous film-forming metal anode body, a metallic lead or riser projecting from the anode body, a dielectric oxide film over the anode body, a semi-conducting layer over the dielectric oxide film, a conducting layer or layers over the semi-conducting layer, a lead or electrical connection to the conducting layer, and an encapsulating means over the layered anode body. The film-forming metal of the anode body is generally selected from the group consisting of aluminum, titanium, zirconium, tantalum and niobium, the preferred metal being tantalum. The term "anode" is used herein to include both the porous film-forming metal anode body and the anode riser.

In the manufacture of tantalum capacitors, for example, tantalum powder is pressed and sintered to provide the porous anode body. Typically, a metallic riser, usually composed of the same metal as the powder, is inserted into the powder during pressing. The metallic riser, usually termed anode riser, provides external electrical connection for the anode side of the finished capacitor. A dielectric tantalum oxide film is then formed over the porous anode body by immersing the body in an acidic solution such as a weak phosphoric acid solution and then applying a voltage potential between the body and a counter-electrode immersed in the solution. This step of forming an oxide film is generally referred to as anodization. The anode is then dipped into a solution of manganese nitrate ($Mn(NO_3)_2$) in water, and upon removal from the solution is treated with heat and steam to convert or pyrolyze the manganese nitrate contained in solution and adhering to the porous anode to manganese oxide ($MnO_2$), a semi-conducting material. This operation is repeated until there is a substantially uniform layer of $MnO_2$ over the whole anode body. The anode body is then coated with graphite and silver or similar conductive material and then dipped in a solder bath. The resultant solder coating provides a cathode connection and provides means for attachment of the cathode lead. Typically, the attachment of the cathode lead and the application of the solder coating are accomplished in the same operation. The layered anode body, now an operable capacitor, is then encapsulated, usually with a thermoplastic or thermosetting resin.

One significant problem in the manufacturing process for tantalum capacitors as outlined above is that as the anodes are dipped into the manganese nitrate solution prior to pyrolysis, care must be taken to insure that the anodes are not over-dipped, that is, immersed further than the top of the anode body. If the anodes are over-dipped, a layer of $MnO_2$ may be formed on part of the riser and when a lead is welded to the anode riser near the anode body, a short may be developed between the $MnO_2$ layer extending up the riser and the metal of the riser or the weld itself. In addition, the layer of $MnO_2$ on part of the anode riser may materially increase the chances of harmful leakage current or even a short due to a fracture in the dielectric oxide film caused by flexing or bending of the anode riser.

It is quite difficult to accurately control how far the anodes are dipped into the solution, especially when very small anodes are being processed continuously in large quantities. One reason is that production dipping mechanisms for the anodes may not be controlled to the accuracies required for precise dipping. Another reason is that a plurality of anodes are usually attached to a single fixture for processing and a variance in alignment of the tops of the anode bodies relative to the fixture of several hundreths of an inch is not uncommon. Therefore, some anodes of the fixture may be over-dipped in order to adequately dip all the anodes of the fixture. Also the surface of the manganese nitrate solution may become agitated by ordinary mechanical vibrations and create minute waves which cause at least part of the anode riser to be wetted by the solution. The level of the solution may also change from time to time relative to the anode fixture due to imprecise level control, evaporation, or even the normal loss of solution by entrainment on previously processed anodes. Furthermore, the porous nature of the anode body and the anode riser may allow "wicking" of the manganese nitrate solution so that the solution moves up the anode riser by capillary action and thereby wets the riser. If the anodes are underdipped to compensate for the lack of precise control on the dipping operation, the anode body may not have a complete layer of $MnO_2$ over its total surface and thus will not provide the desired electrical characteristics when used in a capacitor.

In attempts to remedy this problem, various types of materials in a variety of shapes have been affixed to the anode to render the anode riser non-wetting to the manganese nitrate solution and therefore allow for a certain amount of over-dipping. Examples of these materials are Mylar sleeves melted or shrunk onto the riser and polytetrafluoroethylene washers placed over the riser and on top of the anode body. These methods of anode riser protection have not been entirely successful as they are either difficult and time-consuming to apply to the anode riser or they do not, in some instances, prevent a harmful build-up of $MnO_2$ on the riser. In addition, it is generally desirable to apply the protective material before the anodization step for reasons of convenience and in order to minimize damage to the dielectric oxide layer after it has been formed. If anodization does not take place beneath the material, the layer must adhere well enough to the anode riser to prevent creepage of manganese nitrite solution underneath the layer and thereby prevent shorts between the unanodized metal of the riser and the resultant $MnO_2$ layer. Some of the above materials prevent anodization from occuring on the surfaces beneath them but do not adhere well enough and therefore must be applied following the anodization step thereby causing further manufacturing problems. Furthermore, it is sometimes difficult and time-consuming to accurately apply the particular material onto the anode riser to insure that the precise portion of the anode riser that needs the most protection is protected, especially when processing large amounts of anodes in a production operation.

It is therefore a feature of the present invention to provide an apparatus for applying material to a substrate. Yet another feature of the present invention is that the material is applied to a substrate by dispensing the material onto a belt means and by contacting the belt means and the substrate, transferring the material to the substrate. Yet another feature of the present invention is that the method and apparatus are adapted for applying a band of material to anode riser of a capacitor to help prevent the build-up of manganese dioxide on the riser. Yet another feature of the present invention is that silicone type materials may be applied to an anode riser by the means and methods of this invention so as to help prevent the build-up of manganese dioxide on the anode riser. Another feature is that the use of silicone type materials to help prevent the build-up of manganese dioxide on the anode riser of film-forming metal capacitors allows anodization to take place beneath the silicone type materials if it has been applied in a sufficiently thin layer. A further feature is that only a very thin layer of silicone type material is required to prevent wetting of an anode riser by a solution of manganese nitrate.

These and various other features of this invention as well as many specific advantages will become more fully apparent from a detailed consideration of the remainder of this disclosure including the examples and the appended claims in conjunction with the accompanying drawings in which;

FIG. 1 of the drawing is a cross-sectional view of a typical film-forming metal capacitor anode, FIG. 2 of the drawing illustrates one embodiment of an apparatus for applying a band of material to a substrate, FIG. 3 of the drawing illustrates another embodiment of an apparatus for applying a band of material to a substrate, FIG. 4 of the drawing illustrates a portion of the apparatus shown in FIG. 3 where a band of material is being applied to the riser of a capacitor anode.

Generally, the present invention relates to a means and method for applying material to a substrate. In one application of the means and method of the present invention, a band of material is applied to a portion of a riser of a capacitor anode. More specifically, the means and method of the invention comprise dispensing material onto a belt means and then by contacting the substrate with the belt means, transferring the material from the belt means to the substrate. In one specific embodiment, the invention comprehends dispensing a band of a silicone type material onto a belt means and transferring the material on the belt means to the riser of a capacitor anode. The band of silicone type material helps to provide protection for the anode riser during subsequent processing steps including rendering portions of the riser non-wetting to a solution of manganese nitrate in order to help prevent a build-up of manganese dioxide on the anode riser.

The invention can be more clearly understood by reference to the drawing. It is again emphasized that certain features of the invention will be discussed with reference to a particular application such as capacitor manufacture for the purposes of illustration only and the invention is not thereby limited to that particular application.

FIG. 1 is a cross-sectional view of a film-forming metal anode 10 which can be utilized in an electrolytic capacitor (not shown). The anode 10 includes a porous sintered anode body 11 and a metal riser 12 suitably attached to the body. The approximate area of the riser 12 in need of protection during dipping is that area shown covered by the band of material 13 which is applied according to this invention. The presently preferred material for layer 13 is a material containing silicone. In the present practice of this invention, the band of material 13 applied to the anode riser 12 is about 100 mils wide, starting from about 0–30 mils above the top surface of the anode body 11.

FIG. 2 is one embodiment of an apparatus for applying a protective layer to an anode riser according to this invention. Apparatus 20 comprises support means 21, typically mounted in the vertical position. Located on the support means are reels 22 and 23 which have belt means 24 and 25 partially wound about them. Belt means 24 and 25 pass over rollers 26 and pressure wheels 27 and 28 are taken up by take-up reels 29 and 30 respectively. Also attached to the support means 21 are dispensing means 31 and 32 which dispense protective material (not shown) onto belt means 24 and 25. Dispensing means 31 and 32 are actuated, for example, by air pressure. One type of dispensing means that has operated satisfactorily is an air actuated syringe with a suitable needle which gives precise control over the amount of material dispensed and thus the width of the band of material. Loading bar 33 is located between the two pressure wheels and projects from the support means 21 a distance less than the distance the belt means 24 and 25 are from the support means. Driving means (not shown) rotate reels 22 and 23 and take-up reels 29 and 30 in the direction shown by the arrows.

In operation of the apparatus 20, a fixture of anodes 34, is loaded on the left side of the loading bar 33 and moved toward the pressure wheels 27 and 28. Dispensing means 31 and 32 apply a band of material (not shown) onto the belt means 24 and 25 as they move past the dispensing means. As the fixture passes between the pressure wheels 27 and 28, material on the belt means 24 and 25 is transferred onto the anode risers so as to produce the anode as shown in FIG. 1. Preferably the pressure wheels 27 and 28 are spring loaded so as to apply a constant pressure to the belt means 24 and 25 as the wheels pass over the anode risers. The fixture of anodes 34 is then removed from the right hand side of the loading bar 33.

Although the apparatus shown in FIG. 2 has only one dispensing means per belt means, it is to be understood that more than one dispensing means per belt means may be used to provide more than one band of material on the belt means and thus eventually on the substrate.

The belt means 24 and 25 may be composed of any material that is flexible and which will allow the material being dispensed to slightly adhere to it. In addition, the belt means 24 and 25 should be fairly inexpensive so that the belt means may be discarded after it has been used. Two materials that have proved satisfactory for use in capacitor manufacture when applying silicone type materials are paper and plastics such as polyester tape. A paper belt means that has been found to be particularly satisfactory is an unoiled, buffed, perforator paper tape. Typically, the belt means are about ½ inch to about 3 inches in width.

FIG. 3 illustrates another embodiment of an apparatus for applying a band of material to a substrate. Apparatus 50 contains support means 51, which is generally located in the vertical position. Located on support means 51 are reels 52 and 53 and take-up reels 54 and 55. Belt means 56 is partial wound about reel 52 and passes over roller 57 and over loading bar 58. At the end of the loading bar 58, belt means 56 passes over roller 59 and then is taken up by take-up reel 54. Belt means 57 is partially wound about reel 53 and passes over rollers 60 at which point a band of material (not shown) is dispensed by dispensing means 61 onto belt means 57. Transferring means 62 presses belt means 57 onto belt means 56 thereby transferring part of the band of material from belt means 57 to belt means 56. Belt means 57, by going over rollers 63 forms loading area 54 where fixtures of anodes 81 are placed on belt means 56. Belt means 56 carries the fixtures 81 between transfer wheel 66 where the material is transferred to the risers of the anodes on fixture 81. Belt means 56 and 57 are wound up on take-up reels 54 and 55 after use.

FIG. 4 is a perspective view of the area of the apparatus 50 of FIG. 3 where the material is applied to the anode risers. Belt means 56 carries a fixture 81 of anodes 10. The anode risers 12 of anodes 10 are welded to fixture bar 82. The fixture bar 82 is supported by the loading bar 58. Also located on belt means 56 is a band of material 83 previously dispensed by dispensing means (not shown). As belt means 56 carrying the fixture 81 advances in the direction shown by the arrow, the fixture is brought into contact with belt means 57 by transfer wheel 66. Belt means 57 also has a band of material (not shown) on its lower surface 84. The contact of the two belt means 56 and 57 produces a band of material 13 completely around the anode riser 12. At the end portion of belt means 56, the fixture 81 is removed from the belt means for further processing.

There are several advantages associated with the use of apparatus as shown in FIGS. 3 and 4. One advantage is that the fixture of anodes 81 can be placed on belt means 56 with the top portion of the anode body 11 abutting the edge of the belt means, thus allowing the material 13 to be applied a uniform distance from the top of the anode body. Thus any variations in the distance from the anode bodies 11 to the fixture bar 82 are irrelevant since the fixture bar need not be used as a reference point for applying the band of material 13.

Another advantage is that since material is transferred from one belt means to the other, problems in aligning the two dispensing means are eliminated. In addition, since the lower belt means 56 carries the fixture 81 of anodes 10, separate driving means are not required to move the fixtures.

A further advantage is that the band of material may be applied to the anode risers with relatively precise control as to the location of the band of material on the anode riser. Since the dispensing means is fixed relative to the belt means and the positions the anodes also fixed relative to the belt means, consistent and reproducable applications to the anode risers may be achieved in a continuous manner.

While the method and apparatus of the present invention are adaptable to apply a wide variety of materials to a substrate, the preferred materials for use in electrolytic capacitor manufacture are materials containing silicone. It has been found that room temperature curing (RTV) or non-curing silicone type materials work equally well in most applications. Several satisfactory silicone type materials are Dow Corning RTV No. 732 and No. 734 silicone rubbers, General Electric RTV No. 112 silicone rubber, and Dow Corning No. 44 silicone grease.

Thus the present invention comprehends a means and method for applying material to a substrate, especially a band of material to a substrate. The invention allows a band of material to be applied to a substrate economically and efficiently and with good dimensional control. In one application, the invention is useful in applying a band of material over an anode riser in the manufacture of film-forming metal capacitors so as to help prevent the build-up of manganese dioxide on the riser during pyrolysis and to help prevent mechanical damage to the anode during the assembly of the capacitor which incorporates the anode. By the means and method of this invention, the band of material may be continuously applied in a controlled and precise manner to the anode risers.

While the present invention has been described with reference to particular embodiments thereof, it will be understood that numerous modifications may be made by those skilled in art without actually departing from the spirit and scope of the invention as defined in the appended claims.

I claim:

1. An apparatus for applying material to a selected portion of articles comprising:
    a. a first belt and first cooperating rollers providing movement to same.
    b. means disposed adjacent said first belt applying a first band of material to same,
    c. a second belt and second cooperating rollers providing movement to same over a loading bar,
    d. means disposed above said loading bar bringing said first belt into engagement with said second belt after said first band of material has been applied so as to transfer a portion of same to said second belt and provide a second band of material thereon,
    e. at least one of said first cooperating rollers disposed to separate said first belt from said second belt after said material has been transferred,
    f. means holding said articles on said second belt in a position that said selected portions engage said second band after it has been provided, and
    g. means returning said first belt back into engagement with said second belt and also with said selected portions so as to apply at least a portion of said first band of material to said selected portion.

2. An apparatus according to claim 1 wherein said first and second belts are composed of paper.

3. An apparatus according to claim 1 wherein said means applying said first band of material is a hypodermic type needle.

4. An apparatus according to claim 1 wherein said means returning said first belt back into engagement with said second belt is a wheel.

* * * * *